United States Patent [19]

Otremba

[11] Patent Number: 4,597,215
[45] Date of Patent: Jul. 1, 1986

[54] POWERED JIGGING DEVICE

[76] Inventor: Harvey E. Otremba, Box 251, Sequim, Wash. 98382

[21] Appl. No.: 613,298

[22] Filed: May 23, 1984

Related U.S. Application Data

[63] Continuation-in-part of Ser. No. 508,844, Jun. 29, 1983, abandoned.

[51] Int. Cl.$^4$ ............................................. A01K 97/10
[52] U.S. Cl. ....................................... 43/19.2; 43/26.1
[58] Field of Search ........................... 43/19.2, 17, 26.1

[56] References Cited

U.S. PATENT DOCUMENTS

| | | | |
|---|---|---|---|
| 2,643,478 | 6/1953 | Paulsen | 43/19.2 |
| 3,031,790 | 5/1962 | Duryea | 43/19.2 |
| 3,168,789 | 2/1965 | Gednatske | 43/19.2 |
| 3,691,668 | 9/1972 | Strebig | 43/19.2 |
| 3,839,810 | 10/1974 | Lagasse | 43/19.2 |
| 4,100,695 | 7/1978 | Blanchard | 43/19.2 |
| 4,251,939 | 2/1981 | Tiede | 43/26.1 |

*Primary Examiner*—Nicholas P. Godici
*Assistant Examiner*—Kurt Rowan
*Attorney, Agent, or Firm*—William I. Beach

[57] ABSTRACT

A powered jigging device for oscillating a fish pole supported in a rotatable holder operated by means for moving the pole at variable moments of time and distance. The means include a motor for driving a set of matched gears connected to a cam arranged to oscillate the holder. The means are responsive to a time delay control unit.

13 Claims, 6 Drawing Figures

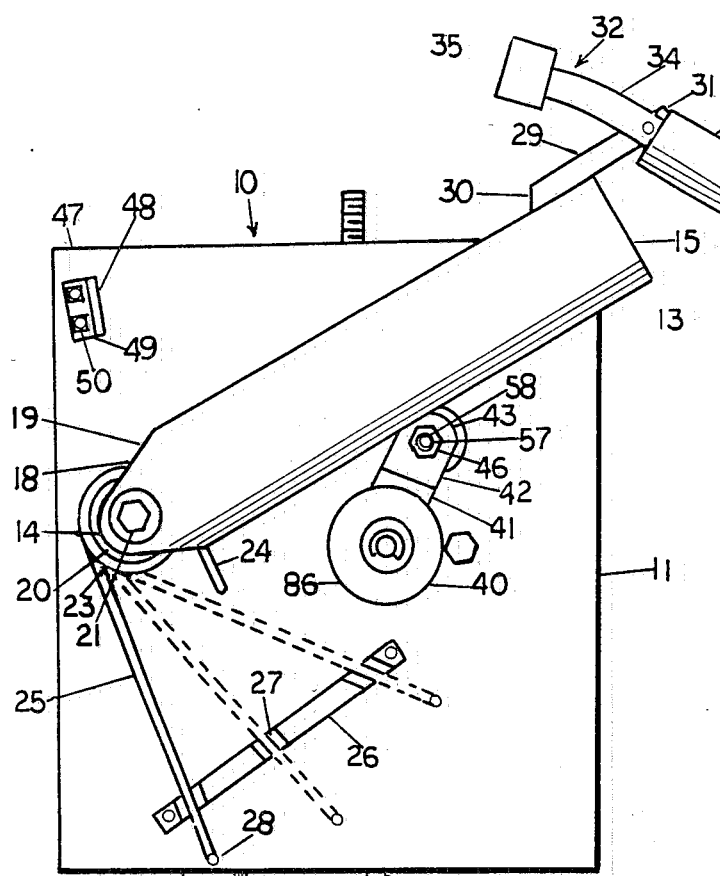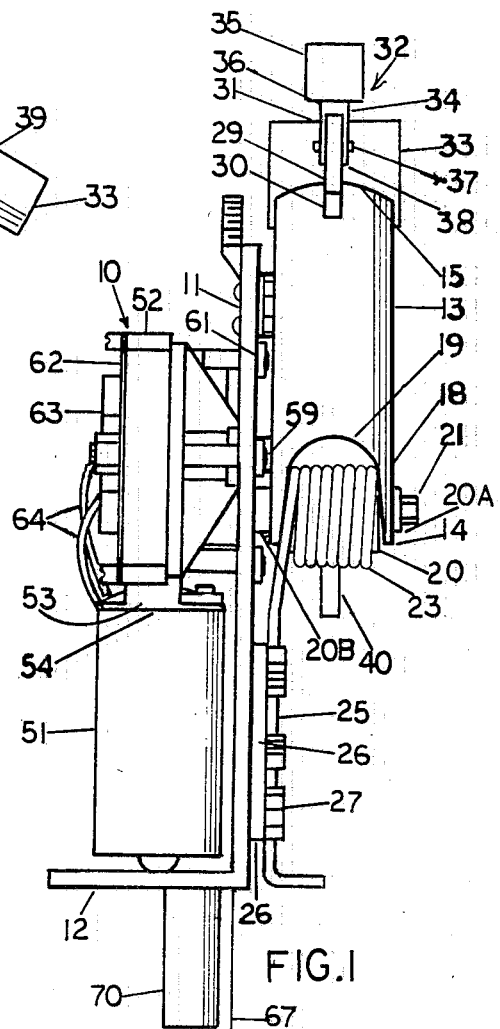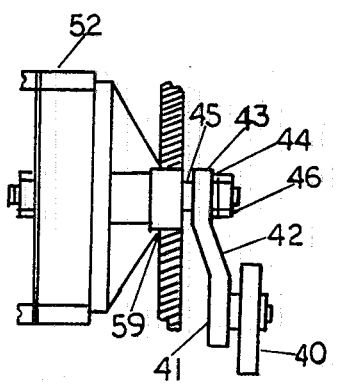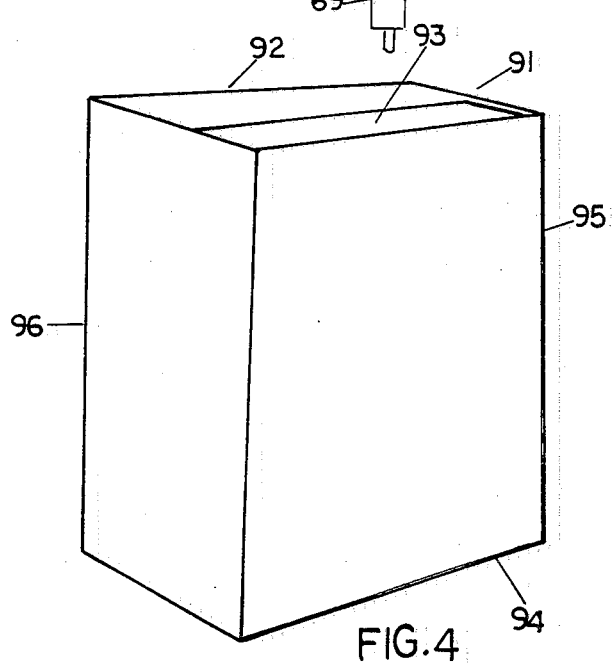

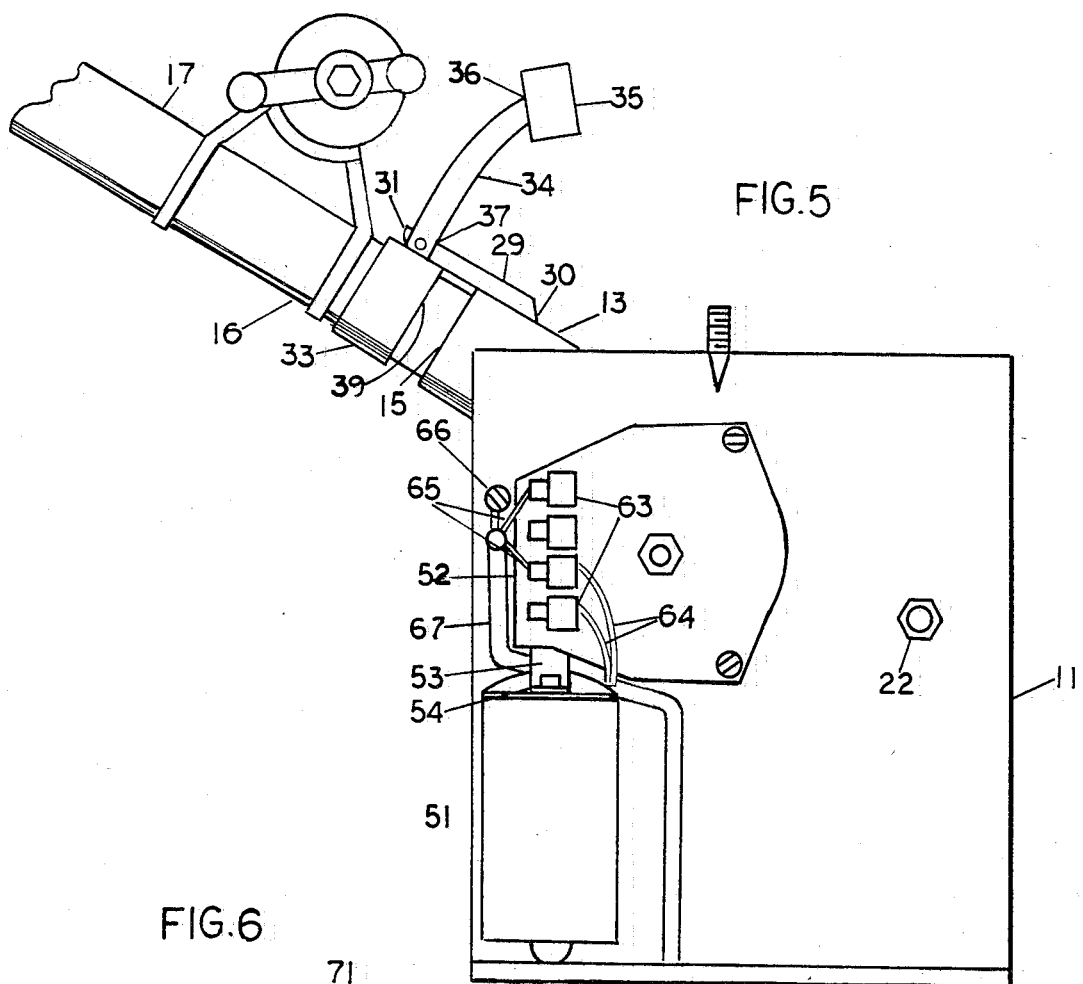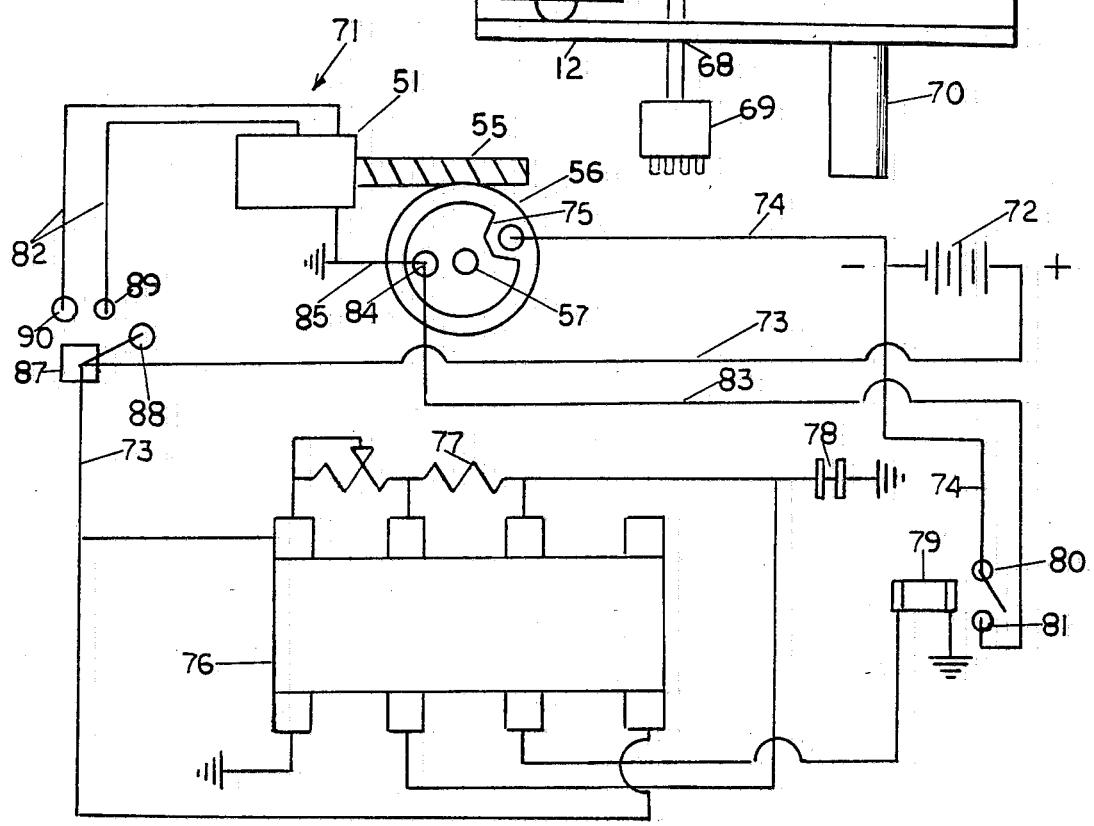

POWERED JIGGING DEVICE

This application is a continuation-in-part of Ser. No. 508,844 filed June 29, 1983, now abandoned.

BACKGROUND OF THE INVENTION

1. Field of the Invention

The present invention relates to fish pole jigglers and more particularly to that kind which can control the translatory movement of the pole by variable time switching means.

2. Description of the Prior Art

The fish pole jigging devices available today consists generally of hand operated or powered devices for moving the pole up and down in an oscillating motion. Swinging the pole by hand in a jerking motion is tiring and a fisherman's arm eventually needs rest. The loss of fishing time in resting is unacceptable to the average fisherman. For this reason the powered jigging device has been developed.

In searching the prior art several patents of interest were disclosed. These included U.S. Pat. Nos. 2,758,407, 3,001,317, 3,031,790 and 4,251,939.

The fishing pole apparatus described in U.S. Pat. No. 2,758,407 concerns an electric motor, driving gears, an eccentrically operated wheel engaging the fish pole and a switch operated by a flashlight battery. The pole is supported on a trunnion mount at the forward portion of the pole and the rear portion on the eccentric wheel. Since the reel end of the pole rests on the hub between the wheel flanges the pole rises and falls as the eccentric wheels make a rolling rotation around the eccentric center. This produces a constant frequency of movement. To disrupt the frequency the hub or groove of the eccentric wheel upon which the pole rests may be contoured such that the pole will jiggle in the up and down movement.

Another device powered by a flashlight battery is shown in U.S. Pat. No. 3,001,317. In this case the device includes a so-called bow and saddle arrangement connected to a coil. With the bow and saddle disposed in an intermediate position in the terminals to the battery are closed causing the coil to be energized. This tilts the saddle whereupon the circuit is disrupted and subsequently the closing of the battery terminals energizes the coil again to cause a continuous oscillation of the saddle. Each time the saddle tilts the trunnion connected thereto upon which the fish pole is supported is moved upwardly and downwardly at a constant frequency.

The device shown in U.S. Pat. No. 3,031,790 includes a motor, a set of gears, an eccentric crank arm connected to an agitator rod having a loop end for holding a fish pole, a transformer, rheostat and a receptacle for an electric plug. In operation the motor drives a set of meshed gears rotatably connected to a crank arm. The arm is also connected to the rear portion of the agitator rod which has a rear end pivotally mounted. As the gears rotate the crank arm urges the agitator rod up and down for one revolution of the ring gear. This motion may be changed by reversing the rotation of the motor. For example, when the rotation is clockwise the upstroke of the agitator rod will be faster than the downstroke. When the rotation is counter-clockwise the upstroke is slower than the downstroke.

The device shown in U.S. Pat. No. 4,251,939 consists of a base, a fish pole holder having a hook-like end for gripping the pole, and a motor which turns a wheel made up of spaced vertical disks joined at a centrally disposed hub. A series of holes are drilled in the disks such that pins can be inserted in the holes in parallel relationship. The forward portion of the pole is positioned on one of the pins and rides downwardly on that pin until an upwardly moving pin lifts it off and moves it up to the top of the wheel. When inserting pins in various positions on the disk it is possible to jiggle the pole in the up and down movement.

In considering the various structures and means suggested by the above cited patents it appears that none provide the optimum series of up and down motion of the fish pole for catching fish generally preferred by fishermen. The opinion of most fishermen is that the pole should be jerked suddenly in the upstroke and dropped immediately in the downstroke so as to induce slack in the fish line and let the hook and bait flutter slowly downwardly in the water. Preferably, at the bottom of the downstroke there should be a pause of several seconds to allow fish to approach the bait before jerking the pole on the upstroke again.

In light of the above it is the object of the present invention to provide a portable device that will clearly reproduce the preferred up and down motion that fishermen used with hand operated poles to catch fish. This device can be manufactured inexpensively and is adaptable to most fishing waters.

SUMMARY OF THE INVENTION

In carrying out the principles of the present invention in accordance with a preferred imbodiment thereof a powered jigging device can oscillate a fish pole in translatory movement at variable periods of time. Means are also provided to change the speed of motion and distance of travel.

The device is an L-shaped structure constructed of an elongated plate joined at a right angle to a side edge of a shorter plate. Connected to the elongated plate is a fish pole holder having a rear end rotatably mounted thereon. The front end of the holder has an opening to receive therein the reel end of the pole. On the other side of the elongated plate a gear box and gear train are mounted such that a revolving shaft driven by the gears has an outer end extending through an opening in the elongated plate. The fish pole holder is oscillated by a cam connected to a link that is connected at an outer end to the end of the revolving shaft. A motor mounted adjacent to the gear box has a shaft extending within to drive the gear train. The motor and gear box are operated and powered by a removable electrical connector to an electrical receptacle connected to a variable time delay control unit and battery.

BRIEF DESCRIPTION OF THE DRAWING

FIG. 1 is an elevated rear view of a preferred embodiment of the present invention shown in mounted position for fishing, FIG. 2 is a right hand elevated view of FIG. 1 showing the mounted position of the fish pole holder, cam means, and holder stop member, FIG. 3 is a detailed view of the cam means' disk and offset arm taken along line 3—3 of FIG. 2, FIG. 4 is a prospective view of the housing for enclosing the device of FIG. 1, FIG. 5 is a left hand elevated view of FIG. 1 showing the motor and gear box arrangement, FIG. 6 is a schematic sketch of the circuitry provided by the time delay control unit.

DETAILED DESCRIPTION OF THE PRESENT INVENTION

Referring to FIGS. 1 through 5 it can be seen that device 10 includes an upright, L-shaped structure defining an elongated, rectangular plate 11 secured at right angles to a shorter, rectangular plate 12. On the right hand side of device 10 as shown in FIG. 2 is a tubular fish pole holder 13. Holder 13 has a rear end 14 rotatably connected to plate 11 and an open front end 15 for receiving the reel end 16 of fish pole 17. Rear end 14 is formed with extending spaced side portions 18 and cut-out portions 19 of the tubular holder. Disposed transversely between and connected to side portions 18 is a bushing 20. Inserted in bushing 20 together with washer 20A and spacer 20B is bolt 21 forming an axle about which holder 13 rotates. The threaded end of bolt 21 extends through an opening in plate 11 and secured from turning by fastener 22, not shown. Surrounding bushing 20 and extending between side portions 18 is a coiled spring 23 which has an outer strand 24 formed downwardly to an abutting contact with cut-out portion 19. At the inner end is a strand 25 which extends forewardly and parallel to the side of plate 11 and retained in a ratchet-like member 26 mounted on plate 11. Member 26 has a multiplicity of upright spaced teeth 27 arranged in radial alignment with respect to the movement of the end 28 of strand 25. As the strand is moved from a position between a pair of teeth upwardly the tension rate of spring 23 on holder 13 increases thereby exerting more upward pressure on the holder.

On the front end of the holder is mounted pivotal means for preventing the fish pole 17 from turning within holder 13 during the rocking movement of a boat in rough waters. The means comprises a horizontal arm 29 which has a rear end 30 mounted on the open end of holder 13, and extends forwardly to a distal end 31 bored for a pivotal connection. Included is a counterbalancing member 32 which has a circular band 33 connected to an upwardly extending vertical arm 34. The arm 34 has a weighted mass 35 secured to an outer end 36. The inner end connection 37 of the arm 34 to band 33 is slotted and rotationally pinned astride of the distal end 31 of arm 29. The weighted mass 35 at the outer end of arm 34 applies a constant moment about the pin connection to arm 29 such that band 33 provides an opening at a substantially different angle with the alignment of fish pole 17 and the opening in holder 13. Subsequently, when the reel end of fish pole 17 is inserted through opening 39 of band 33 and opening 15 of holder 13 the binding effect on the fish pole presses it against the inside surface of the holder.

Cam means is mounted adjacent to holder 13 and positioned to engage and rotate the holder about its rear end connection to plate 11. This includes a cam disk 40 rotatably connected at the radial center to an offset end 41 of arm 42 by a spacer washer, a lockwasher and an axle pin threadedly fastened in arm 42. The other end 43 is secured to the end of a revolving shaft 57 extending through an opening 58 in plate 11 with a washer 44, a bushing 45 and nut 46 threadedly turned on the end of shaft 57, see FIGS. 2 and 3. The revolving shaft is connected to a gear box which is mounted on the left hand side of plate 11 and will be described fully later. The cam disk 40 and offset arm 42 is shown in FIG. 3.

Disposed on the upper front corner 47 of holder 13 is an L-shaped stop member 48 which has a vertical leg 49 fastened to plate 11 by a pair of bolts and nuts 50. Stop member 48 is positioned angularly with respect to holder 13, so that a surface contact is made with the holder on the upstroke movement.

Included in the left hand view of device 10 as shown in FIG. 5 is a motor 51 connected to gear box 52 by drive shaft housing 53. Enclosed within housing 53 is drive shaft 54, not shown, extending from motor 51 to a rotating connection with the gear box worm gear 55. Worm gear 55 is rotatably meshed with ring gear 56 which drives revolving shaft 57, see FIGS. 2 and 6. Shaft 57 has a threaded end 58 extending through an opening 59 in plate 11. As previously mentioned the other end 43 of arm 42 is secured to the threaded end 58 of revolving shaft 57 and secured together with nut 46.

Gear box 52 is mounted on plate 11 by three internally threaded bushings 61 fastened thereon by three bolts threadedly engaged in plate 11, see FIGS. 1 and 5. On the exterior face 62 of gear box 52 are electrical contacts 63 connected to motor 51 and ring gear 56 by a pair of wires 64. Also connected to contacts 63 is a pair of wires 65 and a ground wire 66 attached to face 62 of gear box 52. Wires 65 and 66 lead through cable 67 and on through opening 68 in shorter plate 12 to an electrical disconnect connector 69.

Mounted adjacent to connector 69 is a pronglike member 70 extending outwardly from the outer side of plate 12. Member 70 has sufficient diameter and length to be inserted in conventional pole holders of the type clamped to a gunwale of a boat. Supported in this manner the jigging device 10, as shown in FIG. 1, is in suitable position to fish.

A variable time delay control unit illustrated in the circuitry relating to jigging device 10 and operation thereof is shown in FIG. 6 and described in detail below. Control unit 71 has a three pole switch and circuitry for operating and controlling the jigging motion of the fish pole 17. When the two speed motor 51 is activated in low or high speed by the three pole switch and operates the cam means the fish pole holder is raised and lowered in one complete revolution.

The complete operation of device 10 can best be explained by again referring to the circuitry shown in FIG. 6. It can be seen that the circuitry of control unit 71 has leads 64 connected to the two speed motor 51, ring gear 56 meshed with worm gear 55, and driven by rotating shaft 54 extending from motor 51. Included also is a power source provided by a 12 volt battery 72. Battery 72 has a positive terminal 73 connected to motor 51 and a negative terminal 74 connected to one side of ring gear 56. It can be seen also in this view that the negative contact to the ring gear is disposed in a slot or void 75, adjacent to the rim and separated from contact therewith. At this point in time of operation the battery circuit to motor 51 is broken and the rotation of ring gear 56 is momentarily halted, cam disk 40 has returned to a neutral position and a momentary pause of rotation. Holder 13 drops under tension from spring 23 until engaged again by cam disk 40 and started upwardly to the top of its upstroke at stop member 48. When the fish pole in holder 13 drops, the line becomes instantly slack allowing the weighted fish hook and bait to flutter slowly downwardly in the water. The interval of time delay in the cycle of upstroke and downstroke motion of holder 13 is selectively elected by control unit 71. In the circuitry as shown in FIG. 6 the control unit 71 includes an electronic chip 76, a variable charging rate resister 77, a charging capacitor 78, a relay 79 which has bridging contact 80 and 81 and a three pole switch with a pair of positive leads 82 to the two speed motor. The positive terminal 73 of battery 72 is also connected to chip 76 and the negative terminal 74 to contact 80 of relay 79. The selected interval of time delay is arranged by changing the load on resister 77 whereupon chip 76 charges the capacitor 78. The capacitor then discharges instantly to the relay 79 which causes contact 80 to close with contact 81 for about a second or two sufficient to send a short surge of negative voltage along lead 83 to the opposite side 84 of ring gear 56 which is likewise connected to the negative lead 85 on the side of motor 51. The relay contact of 80 to 81 is then instantly opened and the short negative voltage applied to ring gear 56 is sufficient to rotate the gear until the negative terminal is in contact with the rim surface of ring gear. The circuit to the battery 72 is then closed and the motor 51 is energized and moves holder 13 on another up and down cycle. In the interval, the ring gear has completed one revolution, pauses and started for another revolution for each cycle. For example, when ring gear 56 rotates to the location where the negative terminal 74 lay within the void area 75 the cam disk 40 is stopped in a neutral position 86. When the cycle is started again the cam disk rotates counter clockwise until it engages and lifts holder 13, in a jerking movement, upwardly until halted by stop member 48. At this point cam disk 40 begins to rotate downwardly and lowering holder 13 subsequently until the neutral position 86 is reached and restrained for the interval time set by control unit 71. The three pole switch 87 has a contact arm 88 which when bridged with contact 89 induces the motor to run at high speed and with contact 90 induces the motor to run at low speed. The above described motor, gear box and time delay control unit are similar to those employed for automotive windshield wipers and are commercially available.

In FIG. 4 is shown a housing 91 for enclosing device 10 if the matter of corrosion or bad weather becomes a problem. Housing 91 has a top side 92 with a slotted opening 93 for access and exterior movement of the front end of holder 13. The bottom side 94 is open so as to slip over and enclose device 10. There is a front side 95 and a rear side 96 completing housing 91.

From the description and illustration of the present invention it is obvious that it provides important advantages that can be used effectively to catch fish. The foregoing description is to be clearly understood to be given by way of example only, the spirit and scope of the present invention being limited solely by the appended claims.

I claim:

1. An improved jigging device for oscillating a fish pole at variable frequencies of translatory motion operated in combination with a system of motor, gear train, variable time delay control unit and power source, wherein the improvement comprises:
   an L-shaped structure having a side edge of an elongated plate joined at a right angle to a side edge of a shorter plate,
   a fish pole holder rotatably mounted at a rear end to a side of the elongated plate and an open front end for receiving within the reel end of the pole,
   a gear box enclosing a gear train mounted on an opposite side including an end of a revolving shaft extending through an opening in said plate,
   means for oscillating the holder comprising a cam and linkage, the linkage having an outer end connected to the end of the revolving shaft,
   a motor connected to the gear box having a shaft extending therein to drive the gear train, and
   a variable time delay control unit and battery having an electrical receptacle removably connected to an electrical plug leading to said gear box and the motor.

2. A device as set forth in claim 1, wherein:
   said holder has a bore there through and an upper and lower portion of the rear wall removed providing opposite extending side portions,
   a bushing secured transversely between the side portions, and
   an axle-like bolt inserted through the bushing about which said holder rotates and fastened to the elongated plate.

3. A device as recited in claim 1, wherein:
   the means for oscillating the holder includes a cam disk mounted on an offset end of an arm connected at the outer end to said revolving shaft.

4. A device as set forth in claim 1, wherein:
   the motor is a two speed motor.

5. An improved jigging device for oscillating a fish pole at variable frequencies of translatory motion operated in combination with a system of a motor, gear train, variable time delay control unit and power source, wherein the improvement comprises:
   an L-shaped, upright structure combining an elongated rectangular plate at a lesser side edge to an equivalent side edge of a shorter plate,
   a rotatable fish pole holder comprising an open ended tube elastically mounted at a rear end to the elongated plate and adapted to receive within a front end the reel end of the fish pole,
   means for preventing said fish pole from turning sideways in the holder comprising a pivotal, counterbalancing member mounted on said front end of said holder, the member having an opening for slipping over the reel end of said pole and exerting pressure thereon,
   a gear box enclosing a gear train mounted on the other side of said elongated plate the gear train being adapted to drive a revolving shaft having an end extending through an opening in said plate,
   means for engaging and oscillating said holder in translatory motion, said holder becoming a follower to an adajcent cam disk and offset linkage connected to the end of the revolving shaft,
   a two speed motor mounted on the gear box having a drive shaft extending therein to a rotatable connection with the gear train,
   a variable time delay control unit connected to an electric cable having leads removably connected to an electrical plug adapted to operate said gear box and the motor, the other end of the cable being removably connected to a battery, and
   a box-like housing for enclosing the jigging device including a top side having a slotted opening for access and movement of a portion of the front end of said holder outside of the housing, a front and rear side and an open bottom for slipping over said device.

6. A device as recited in claim 5, wherein:

the L-shaped structure includes a prong-like rod member extending outwardly from the outer face of the shorter plate arranged to be inserted in the front end of a conventional fish boat holder and support said jigging device in optimum position to fish, and a stop member secured to the upper forward corner of the longer side of said elongated plate so as to halt the movement of said holder on the upstroke.

7. A device as recited in claim 5, wherein:

said rotatable holder has spaced side portions at the rear end of the tubular wall extending rearwardly and elastically mounted on the elongated plate including, a bushing transversely connected between the side portions, a bolt inserted through the bushing for rotation thereabout having a threaded end secured through an opening in said elongated plate, and a coiled spring enclosing said bushing connected to said holder and movably connected to said elongated plate adapted to apply tension on said holder.

8. A device as set forth in claim 5, wherein:

the gear train comprises a horizontally driven worm gear meshed with a vertical ring gear.

9. A device as recited in claim 5, wherein:

the counter-balancing member comprises a circular band connected to the lower end of ar arcuate vertical arm pivotally mounted on the distal end of a horizontal arm extending outwardly from a connection on the front end of said holder, said counter-balancing member adapted to exert a binding pressure on said fish pole in said holder.

10. A device as recited in claim 5, wherein:

the means for engaging and oscillating said holder comprises a cam disk rotatably mounted at a center to the offset end of an arm which has the opposite end secured to said end of said revolving shaft, the disk being substantially spaced from the side of said elongated plate to make rolling engagement along the lower longitudinal center line on the surface of said holder.

11. A device as recited in claim 9, wherein:

the vertical arm extending from the band is an arcuate arm and has a weight secured to the upper end, the lower end connected to said band is slotted vertically and disposed over said distal end of the horizontal arm which together are bored and pinned for pivoting said counter-balancing member thereabout.

12. A device as recited in claim 7, wherein:

the spring has an outer uncoiled strand abutting the tubular wall between the side portions of said holder and an inner strand extending rearwardly away from said holder and retained by a ratchet-like member secured to said elongated plate.

13. A device as recited in claim 12, wherein:

the ratchet-like member includes a multiplicity of upturned spaced teeth between which the inner strand is held, when said strand is moved from the space between a pair of teeth to a lower most space between said teeth, said spring exerts an increased rated load on said holder to support it in an upward position.

* * * * *